Jan. 28, 1964   V. L. HANSLEY ETAL   3,119,685
METHOD FOR MELTING METALS
Filed Dec. 17, 1959   2 Sheets-Sheet 1
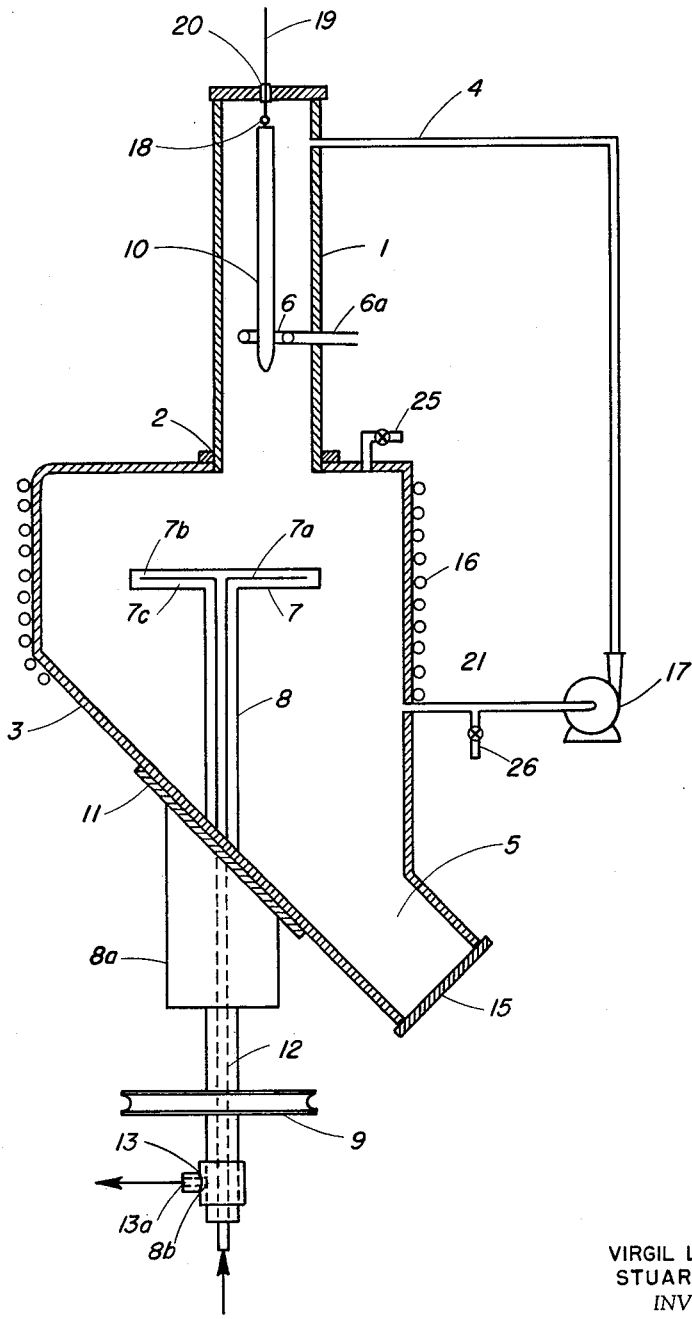
FIG. I
VIRGIL L. HANSLEY
STUART SCHOTT
INVENTORS
BY Lawrence Rosen
ATTORNEY

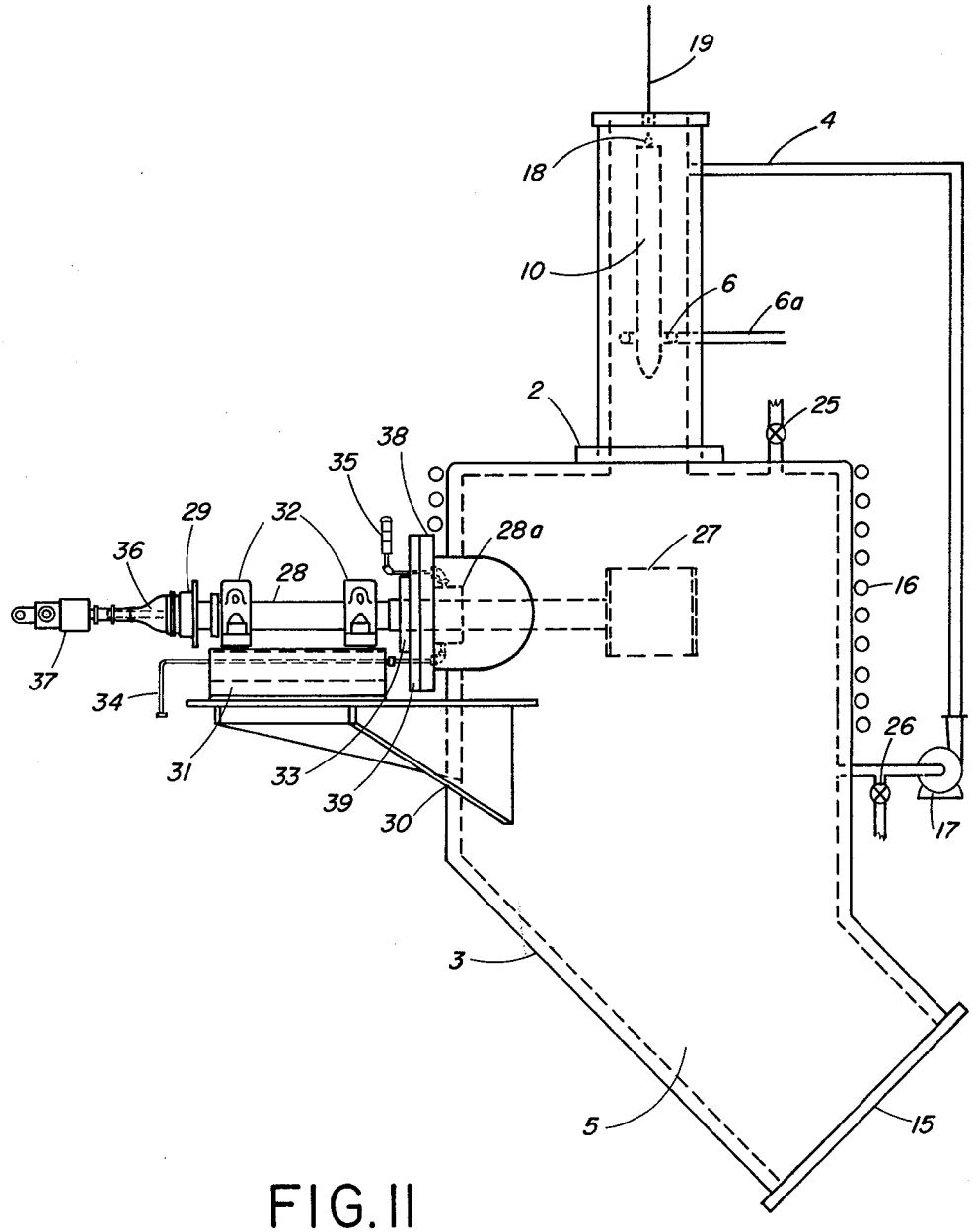
FIG. II

United States Patent Office 3,119,685
Patented Jan. 28, 1964

3,119,685
METHOD FOR MELTING METALS
Virgil L. Hansley and Stuart Schott, Cincinnati, Ohio, assignors to National Distillers and Chemical Corporation, New York, N.Y., a corporation of Virginia
Filed Dec. 17, 1959, Ser. No. 860,120
7 Claims. (Cl. 75—65)

This invention relates to a novel process and apparatus for melting heavy metals. More particularly, the invention pertains to a method and apparatus for effectively purifying refractory metals such as zirconium, titanium, hafnium, columbium and alloys thereof having high melting points.

This application is a continuation-in-part of Serial Number 718,180, filed on February 28, 1958, now abandoned.

In the commercial processes for the manufacture of zirconium, titanium, hafnium, and columbium metals, the corresponding metal halides are treated with conventional reducing agents, e.g. as sodium, calcium and magnesium. The metal product resulting therefrom is in the form of a sponge or powder containing a high percentage of by-product reducing metal halides and often some of the reducing agent trapped in the matrix of the metal. A large proportion of the by-product metal halides can be drained from the sponge while the reaction product mixture is still at temperatures above the melting points of these metal halides. The remaining metal halide impurities often have been found to be approximately equal in weight to the heavy metal sponge, and various methods have been proposed for their removal. In the Kroll process, for example, vacuum distillation was employed to remove residual magnesium halide at temperatures of about 900° C. However, this method has not consistently removed magnesium halide to within specification limits of about 1500 p.p.m., i.e. about 0.15% halide ion. The substitution of water and/or mineral acid leaching for the high vacuum distillation in the Kroll process was not found to be commercially attractive, since specification limits on the halide ion were not consistently met and serious operational hazards were encountered in treating the metal sponge containing appreciable quantities of free magnesium metal as well as the magnesium halide by-product.

When sodium is employed in place of magnesium as the reducing agent, repeated leaching of the resulting metal sponge with water and/or aqueous mineral acid removes all but about 0.2 to 2.0% of the halide ion. Attempts to distill out this residual halide ion contamination under practical operating conditions were only partially successful. Using zirconium sponge prepared from zirconium tetrachloride by sodium reduction for purposes of illustration substantially no removal of residual sodium chloride was accomplished by heating the zirconium sponge to 1200° C. for several hours under vacuum conditions of about 10 microns pressure. Repeated distillation runs showed that substantial removal of sodium chloride was not obtained below the melting point of zirconium, i.e. about 1800° C. The reasons why this method fails to be effective are not fully understood. It is possible, however, that the by-product salt is completely enclosed in the zirconium metal formed in the reduction phase of the process or that the salt is present in the form of a solid solution. In any event, the presence of the by-product salt is very detrimental in the further processing of the metal sponge such as in the arc melting process to obtain a metal ingot. Thus, it has been found to be difficult to arc melt compacts made from zirconium sponge containing appreciable amounts of chloride ion, i.e. above 0.15%, in the form of sodium or magnesium chlorides. There is, for example, considerable difficulty in maintaining the arc due to volatilization of the by-product salts as well as other impurities. This phenomenon of arc blowout is intensified under reduced pressure. In addition, the ingot obtained in the first melting is extremely porous due to the presence of salt, and more than one melting is required in order to eliminate this undesirable porosity. Disintegration of the metal compact used as an electrode during the melting operation also causes difficulties in that unmelted contaminated portions of the metal drop into the ingot.

Magel et al. in the "Journal of Metals," December 1952, disclosed a new method for melting such metals as titanium and zirconium. In general, the described method comprises compacting zirconium or titanium sponge or powder to form a vertical bar which is fed into an induction coil so that the end of the bar is melted off continuously, and the resulting metal drops are collected below in a mold. A similar method has been disclosed in U.S. Patent No. 2,688,169 to Gruber et al. This method, however, has not been successfully adapted to melt zirconium or titanium metal to ingot form in a large scale operation. When the metal drippings are collected in a water cooled copper crucible, they resemble drippings from a candle. Another method has been disclosed in U.S. Patent No. 2,876,094 issued to Lusby. This method requires complete fusion of the sponge and superheating of the resultant melt to form discrete droplets which are cooled to form a shot product. Thus, the zirconium or titanium metal products are obtained in forms which are generally unsuitable for conversion to commercially useful ingots or consumable arc electrodes without further porcessing.

One object of the present invention is to provide an effective method and apparatus for melting refractory, heavy metals which avoids the difficulties previously encountered. Another object of the invention is to provide a method and apparatus wherein a metal containing appreciable amounts of contaminating metal halides and free sodium or other reducing metal may be employed successfully as the starting material. A further object of the present invention is to obtain purification of the metal during the melting operation. A still further object of the invention is the preparation of non-pyrophoric, non-hygroscopic metal products, which can readily be compacted into bars or rods. Other objects and advantages of the invention will be evident from the ensuing description.

In accordance with the present invention, the foregoing objects are accomplished by utilizing a particular type of melting procedure wherein the operation is regulated to produce small nodular particles of the metal, rather than the shot forms previously produced, and to obtain irregular heavy metal chunklets. The resulting chunklets can be readily compacted into bars or rods by using conventional hydraulic pressure techniques, and these bars have been found to be highly suitable as electrodes for the production of ingots by consumable arc melting.

The metal bars can be welded together or drilled and tapped for joining together on the ends by means of stud bolts. When consumable electrodes prepared from these metal chunklets are arc melted in a conventional arc melting furnace, ingots are produced which are equivalent in purity and in surface porosity to the ingots obtained after the Kroll-type sponge has been arc melted twice.

Another essential feature in the present invention is the passage of an inert gas such as argon, helium, mixtures thereof, and other inert gases over the heavy metal rod or bar being treated. It is important to pass this inert gas over the bar being treated to insure the removal of the volatilized metal halide contaminants from the system. This stream of inert gas prevents substantial condensation of the volatile metal halide contaminants on the unmelted portion of the metal rod or on the inner walls of the melting furnace, which condensation might cause serious problems. In the absence of this stream of inert gas flowing through the melting zone, substantial amounts of the volatilized metal halides will condense on the chamber walls and the unmelted portions of the metal rod. In actual operation the volatilized metal halides and traces of the reducing agent are evolved as a fume and some of this fume will condense on all portions of the collecting system. But this condensate caused no difficulty, since it merely became coated on the surface of solid metal and was readily removed by conventional washing or leaching procedures. The inert gas may be passed in either direction over the metal bar or rod being treated.

When uncontaminated heavy metal bars are treated to obtain chunklets, the use of an inert gas flow is also advisable in order to provide surface cooling of the induction heating units in the melting zone. It will be understood, however, that in the usual operations heavy metal bars or rods containing by-product metal halides will be utilized as feed material, and the use of the inert gas flow at substantially atmospheric pressure will be essential for effective and continuous melting. The metal bars or rods may be either square or cylindrical or polygonal in shape, though the cylindrical bar is preferred.

The invention will be more fully understood by reference to the accompanying drawings, which are side elevational views, partly in vertical section, of apparatus according to the present invention and suitable for the purposes thereof.

Referring now to the drawings, FIGS. I and II where like numerals have been used to identify the same parts, the numeral 1 designates a tubular stack closed at its upper end by a cap 14, and at its lower end opening downwardly into a receiver vessel 3, with the stack axis in displaced parallel relation to the vessel axis. The stack 1 is positioned and secured in sealed relation to the vessel 3 as by means of seal plate 2. The stack may be a simple metal cylinder, or in an alternate form may be of a refractory material such as silica, alumina, porcelain or a similar refractory material. The receiver vessel 3 may be of any heat resistant material, including iron, steel, or another metal. The vessel 3 is preferably shaped, as shown, to provide for gravity discharge and/or accumulation of solid particles produced in the manner later described. Heat exchange coils 16 about the upper portion of the vessel provide for circulation of a heat exchange fluid whereby the vessel is cooled during the melting operation or heated during the initial removal of air from the receiver as later described.

Within the stack 1, as shown in FIG. I, there is a generally annular shaped induction coil 6, connected to a source of electrical energy as by means of leads 6a, and supported (by means not shown) in coaxial radially spaced relation to the stack 1, at an intermediate level therein, and adapted to encircle an elongated rod-like element formed of the unrefined metal. Although in FIG. I a single induction coil is shown, under certain circumstances a multiple turn coil may be employed. In the apparatus shown, the rod of unrefined metal is designated by the numeral 10, and is suspended by means of a cable 19 attached to the rod 10 as by means of an eye bolt 18. The cable 19 is passed through the cap 14 in any suitable fashion, whereby to maintain the sealed integrity of the stack and receiver interior atmosphere. In the drawings, the numeral 20 designates a gland disposed in coaxial relation to the stack 1 and cap 14, and adapted to permit the rod 10 to be positioned and extended along the stack axis through the induction coil 6. An additional coil such as 6 may be disposed in vertically spaced coaxial relation above the one shown, where desired to sinter the rod metal prior to fusion as later described.

In the arrangement illustrated, the cable 19 is preferably of a material such as tungsten, titanium, zirconium, or another metal not substantially affected by the operating conditions of the system. As the means for feeding the reactive metal into the system is not an essential feature of the invention, details thereof have been omitted. It is contemplated, however, that various other feed means may be employed, such as hydraulic or other mechanical means, or even hand operated means, and including means for compacting fine pieces or chunks of the reactive metal feed material, and for extruding the compacted material directly into the stack in the form of a bar or rod.

To provide for the removal of volatilized impurities from the furnace, whereby to prevent deposit of impurities on the coil 6, the apparatus includes a conduit system for circulating a purge gas which is inert under the operating conditions encountered. Gases such as helium, argon, or mixtures thereof are suitable gases in the method here disclosed. The conduit system may include a high efficiency cyclone separator connected to blower 17, the inlet of the separator being connected to the receiver chamber 3 by means of the conduit portion 21, and the outlet of the blower to the upper part of stack 1 by means of the conduit portion 4. A valved line 26 connected into conduit portion 21 provides for introduction or withdrawal of the inert gas, and the valved line 25 connected into the receiver 3 provides means for initially displacing or otherwise removing air from the system.

The conduit system as shown provides for circulation of the inert gas downwardly through the stack 1. Where the cooling effect of the coils 6 can be maintained at a suitably efficient level whereby to condense impurities within the receiver, the cyclone separator may be omitted, and these impurities may be removed by washing the metal particles recovered from the receiver.

Reverting to the receiver chamber 3, as previously noted, the lower wall is sloped downwardly at an angle designed to direct metal particles formed from the bar 10 by incipient fusion and resolidification, downwardly toward an outlet nozzle 5 at the lowermost portion of the receiver. In a batch type operation, the nozzle 5 may be closed by means such as the cover plate 15. If connected in a continuous sealed system, wherein the resolidified material is passed directly to additional processing apparatus, the cover plate 15 would be omitted.

Internally of the receiver chamber 3, a rotatable table or plate 7 is disposed and supported at an intermediate level therein, as by means of a hollow shaft 8 extended upwardly through the sloped bottom wall of the vessel 3 by way of a bearing block 10a and a seal plate 11. The table is preferably a hollow unit having an internal baffle 7a. The baffle 7a is disposed so as to divide the hollow interior of the table into upper and lower radial passageways, 7b and 7c respectively, connected at the peripheral edge of the baffle. A conduit 12, disposed coaxially with the shaft 8, opens at its upper end axially through the baffle into communication with the upper passageway 7b. The lower passageway 7c communicates with an annular space formed between the shaft 8 and the conduit 12.

The shaft 8, as well as the table 7 preferably are related axially to the vessel 3, and thereby in displaced parallel relation to the axis of the stack 1. When so disposed, the table extends radially so as to intersect an extension of the stack axis substantially at right angles. The lower ends of the shaft 8 and conduit 12 are provided for sealed relative rotation of the shaft with respect to the conduit as by means such as a stuffing box 8a at the lower end of the shaft. Also at the lower end of the shaft, a non-rotating conduit fitting 13 provides for fluid discharge from the shaft by way of shaft ports 8b and an annular passageway 13a in the fitting. A sealed relationship between shaft and fitting is established by suitable means, not shown. A pulley 9, keyed to the shaft 8, provides means for rotating the shaft.

In the alternate form of the apparatus as illustrated by FIG. II, a rotatable cylindrical element 27 is substituted for the circular plate 7. In this form of the apparatus the cylindrical element 27 is supported on a rotatable hollow shaft 28 which is supported transversely, or diametrically of the receiver vessel 3, in the upper portion thereof, as shown. This shaft is rotated by means of a motor drive (not shown) attached to sprocket 29. The shaft assembly is supported on shelf 30 and support bracket 31 by means of pillow blocks 32.

As in the corresponding construction of FIG. I, the shaft 28 is provided with a shaft seal or stuffing box 28a at its outer end, a shaft seal follow up 33 backed by a vellum gasket (not shown), fixed flange 38, and removable flange 39 welded to stuffing box 28a, to insure an air tight seal. Shaft seal 28a is preferably packed and supplied with oil via pipe 34 to further provide an air tight seal. The amount of oil in shaft seal 28a is regulated by readings taken on sight glass 35. Shaft 28 is provided with an extended coaxial conduit 36 which enables a cooling liquid such as water to be circulated through drum 27. A non-rotating conduit fitting or flexible rotary connection 37 is attached to the end of shaft 28.

Operation of the apparatus according to FIG. II is comparable to that as illustrated by FIG. I in every respect. The nodular particles dropping from the end of the rod 10, strike the chilled surface of the rotatable element 27. These particles give off the vaporized contaminants during their fall, and upon contact with the chilled surface are substantially solidified.

The element 27 may be rotated at variable speeds, for example, from about 20 r.p.m. to about 100 r.p.m. As a result of the combined gravitational and centrifugal effects the solidified particles are passed downwardly in the receiver 3, to collect in and/or to be discharged from the nozzle portion 5 in the manner previously described with reference to FIG. I.

In accordance with one embodiment of this invention, a refractory metal such as zirconium, titanium, hafnium or columbium in the form of sponge or powder is compacted under pressure to obtain self-sustaining rods or bars, which may be welded or bolted together to achieve a feed rod or bar of the desired diameter and length. Utilizing the apparatus shown in FIGS. I and II, the fabricated bar is lowered slowly under controlled conditions through the high frequency coil 6, capable of operating at an optimum frequency for the diameter of the fabricated bar, and of supplying sufficient electrical energy to incipiently fuse the metal. The temperature required will, of course, depend upon the particular metal being treated, and the amount of power required will also depend on the diameter of the rod and its density. Some variation in the character of the chunklets results from faster or slower treatment at higher or lower power inputs. In carrying out the process of this invention the end portion of the compact rod or bar is heated to incipient fusion to produce gravitational separation of relatively small nodular particles of metal, which metal particles fall upon a substantially flat surface or a cylindrical surface maintained at a temperature below the melting point of the metal being treated. Plate 7, for example is continuously rotated by its pulley and shaft whereby the solid metal chunklets as formed are discharged from said flat surface or cylindrical surface by centrifugal force. By avoiding a complete melting of the end of the metal rod and the formation of fully fluid metal drops as taught in the prior art processes, the present process substantially eliminates superheating and substantially decreases the production of shot. The chunklets resulting from the instant process are readily compacted for further treatment following the conventional leaching step. The absence of substantial amounts of shot or solid metal spheres enhances the subsequent compacting step and advantageously lowers the possible metal losses.

As noted above, the choice of frequency will generally be determined by the diameter of the compact bar or rod being treated. The following correlations are presented only for illustrative purposes:

| Diameter, inches: | Frequency, kc. |
| --- | --- |
| 0.5 | 400 |
| 1.0 | 10 |
| 1.5 | 3 |
| 2.0 | 0.5 |

When the sponge or metal rod is lowered into position, an inert gas such as helium, argon or mixtures thereof is continuously circulated through the treating zone. The apparatus must be placed under vacuum prior to commencing the flow of inert gas in order to insure the removal of substantially all of the air. Once the flow of inert gas is established, the coil is connected to a suitable power source and the end of the metal bar begins to heat up and to the incipient fusion point as it is lowered into the induction field. At the same time that the coil is turned on, disc 7 is rotated at a speed of about 30 to 300 r.p.m., though lower speeds may be employed depending upon the size of the unit. Metal particles fall vertically under gravitational force in the form of nodules and impinge on rotating disc 7 where they are cooled and solidified into chunklet form and then thrown by centrifugal force from the surface of the disc and collected in outlet 5. If desirable a scraper (not shown) may be employed to dislodge the chunklets. However, centrifugal force is usually sufficient to throw the cooled chunklets from the rotating disc.

The chunklets prepared in accordance with the method and apparatus of this invention are characterized by their irregular shape, malleability, and non-pyrophoric properties. A typical product contained chunklets having the following screen analysis:

| Size, inches: | Percentage |
| --- | --- |
| Over 2 | 0 |
| Over 1 | 15–20 |
| Over ½ | 40–60 |
| Over ¼ | 10–30 |

It was further found that substantially no shot is produced when employing the method and apparatus of the invention.

Utilizing the apparatus shown in the figures, the rate of incipient fusion of the reactive metal rod will range from about 0.5 to 2 lbs. per minute or higher. The rate of treatment will, of course, depend directly upon the design of the apparatus, the power input, the efficiency of the high frequency coil, the metal being treated and the particular type of product desired. The higher the melting point of the metal bar the more the amount of energy lost by radiation, hence the slower the treating rate for a given power input.

Although zirconium, titanium, hafnium and columbium have been specifically referred to above, it will be understood that other metals having high melting points may be employed. More specifically, metals of group IVB, group VB, group VIB and group VIII of the periodic chart have been found to be particularly adaptable to the process of this invention. Examples of such refractory metals include titanium, hafnium, columbium, tantalum, iron, cobalt, nickel, mixtures and alloys thereof, and the like. In accordance with another aspect of this invention, other materials such as boron, aluminum, tin and zinc may be melted to produce chunklets or gouts. The metal bar or rod used in the process can be made by compaction or extrusion of metal sponge, metal powder and the like. As indicated above, one source of such metal powder or sponge is from the metal production process comprising the reduction of the respective metal halides with magnesium, calcium, sodium or related reducing agents.

The invention will be further understood by reference to the following illustrative example:

EXAMPLE

The practice used in this example is illustrated in FIG. II. Zirconium sponge, having an average analysis as given in the following table, was continuously compacted in an extrusion type press at pressures of 400–1200 p.s.i. to give a continuously extruded rod 1⅛" in diameter, and having a bulk density of 50–65% theoretical. This extrusion is carried out in an enclosed chamber (not shown) which is interconnected with a melting vessel and collection chamber. The entire assembly was evacuated in one micron pressure and back filled with argon to 2 p.s.i.g. prior to melting. When this operation was completed, the high frequency coil was energized and the extrusion initiated.

The extruded rod from the continuous compactor then passed through 1½" diameter single turn induction coil, operating at 50–100 kilowatts input and 10 kilocycles output. The rate of travel (the compacting rate) is adjusted to heat the rod passing through the coil only enough to yield discrete nodules of melt. Under these specified conditions a melt rate of two pounds per minute was obtained. The metal nodules then fell upon an 8" diameter by 8½" long rotating drum, operating at 80 r.p.m. The drum was water cooled so that the chunks would not tend to weld to it; the action of the drum instead tended to spin the chunks into the collection chamber. The capacity of the collection chamber was such that approximately 1,000 lbs. of chunklets are obtained for each running cycle; for each cycle it is usual for the furnace to be deactivated and the chunklets removed. The cycle was reinitiated by re-evacuating the entire assembly and repressuring with argon. The chunklets obtained from the incipient fusing operations are covered with a thin film of salt powder. The salt is now only on the surface and was readily removed by washing with water, following which the chunklets were dried in a stream of warm air. The resultant chunklets averaged from ½" to 2" in size (100% through a 2" mesh screen and 100% were retained on 20 mesh screen). Less than one percent of the material was formed as shot of —8 mesh size.

An average analysis of 80,000 lbs. of zirconium chunklets produced from the sponge described above is also given in the following table. Zirconium chunklets prepared as described above were pressed to a final density of 81% of theoretical in a 300,000 lb. press, obtaining 5 x 5 x 20" compacts, suitable for welding into an electrode bar for consumable arc melting. The resultant compacts were dense and adherent, and no flaking was observed. A conductivity test indicated that the compact bars had resistances of .0045 micro-ohm per centimeter which is satisfactory for use in consumable arc melting.

Table 1

|  | Zirconium Sponge | Zirconium Chunklets |
|---|---|---|
| BHN | 145 | 139 |
| $Cl_2$ | 9,000 p.p.m. | 550 p.p.m. |
| $O_2$ | 1,200 | 1,200 |
| $N_2$ | 35 | 35 |
| C | 200 | 100 |
| Fe | 650 | 400 |
| Na | 5,540 | 240 |
| $H_2O$ | 110 | 200 |
| Al | 40 | 40 |
| Si | 60 | 65 |
| B | <.3 | <.3 |
| Cd | <.3 | <.2 |
| Cr | <20 | <20 |
| Co | <5 | <5 |
| Hf | 60 | 60 |
| Pb | <20 | <20 |
| Mn | <10 | <20 |
| Ni | <20 | <20 |
| Ti | <50 | <20 |
| V | <20 | <20 |
| Mg | <20 | <20 |
| Mo | <20 | <20 |
| Zn | <20 | <20 |
| SN | <20 | <20 |

[1] Spectrographic analyses (p.p.m.) unless otherwise indicated.

The embodiment of this invention shown in the example is the preferred method and apparatus of this invention. The chunklet products are easier to compact for further treatment such as arc melting. It will be further understood that titanium, hafnium and columbium as well as other metals of group IVB, group VB, group VIB and group VIII of the periodic chart may be employed as feed material in the apparatus illustrated in FIGS. I and II to obtain corresponding metal chunklet products similar to those obtained in the example.

It has also been found that it is possible to incorporate alloying metal into the sponge or powder during the compression step to obtain a bar which upon drip melting will yield alloys in platelet form. In this manner Zircaloys 2, 3, 5 as well as other alloys of heavy metals can be prepared even with low boiling metals such as aluminum. In contrast, it has been difficult to make such alloys in the consumable arc melting process because of the extremely high temperature, i.e. about 7000° to 8000° F., of the electric arc. In the present process, temperatures at the end of the heavy metal bar seldom exceed 50 to 100 degrees above the melting point of the metal. For zirconium the top temperature would be about 2800° F., and therefore the tendency to "boil out" the more volatile alloying metal is greatly diminished.

The above data show that by following the method of this invention heavy metal sponge is converted to chunklets, which are more easily handled in many commercial uses due to their non-pyrophoric properties. Another important advantage is the high order of purification achieved during the melting operation.

While this invention has been disclosed and illustrated by the above examples, it will be understood that the invention is obviously subject to other modifications and variations without departing from its broader aspects.

What is claimed is:

1. A method for the purification of a refractory metal bar containing vaporizable solid impurities comprising the following steps: moving said bar into an electrically high frequency induction heated treating zone maintained in an inert atmosphere by a stream of purging inert gas at a temperature sufficient to incipiently fuse said bar without completely melting the metal to vaporize the impurities in said bar and to form partially molten, non-spherical, irregular particles of said metal, removing the vaporized impurities in the stream of purging gas, allowing the irregular particles of said metal to fall from said bar into contact with an element having a solid surface maintained at a temperature below the melting point of the metal and sufficient to cause at least substantial solidification of the irregular particles of said metal, discharging the resulting solidified irregular particles of said metal to a collecting zone and recovering them, and then compacting the recovered irregular metal particles under pressure to form a purified metal bar.

2. The method of claim 1 wherein said refractory metal is selected from the group consisting of zirconium, titanium, hafnium, columbium and alloys thereof.

3. The method of claim 1 wherein said metal is zirconium.

4. The method of claim 1 wherein said metal is titanium.

5. The method of claim 1 wherein said inert gas is selected from the group consisting of argon, helium and mixtures thereof.

6. A method as set forth in claim 1 in which the refractory metal bar is moved continuously endwise into the heating zone, the partially molten, non-spherical, irregular particles are formed at the end of the bar, the element which the falling nodules contact is a substantially horizontal rotating solid element cooled to a temperature to cause substantial solidification of the partially molten irregular metal particles and discharging the resulting solidified irregular particles of the metal from the roating element by centrifugal action to the collecting zone.

7. The method of claim 1 wherein said recovered solidified irregular particles of the metal are washed with water prior to compaction to remove residual surface impurities.

References Cited in the file of this patent
UNITED STATES PATENTS

| | | |
|---|---|---|
| 2,465,545 | Marsh | Mar. 29, 1949 |
| 2,465,893 | Long | Mar. 29, 1949 |
| 2,517,557 | Graham | Aug. 8, 1950 |
| 2,582,120 | Hansgirg | Jan. 8, 1952 |
| 2,620,269 | Haney et al. | Dec. 2, 1952 |
| 2,840,465 | Chisholm et al. | June 24, 1958 |
| 2,876,094 | Lusby | Mar. 3, 1959 |